United States Patent
Kim et al.

(10) Patent No.: US 9,031,119 B2
(45) Date of Patent: May 12, 2015

(54) APPARATUS FOR WIDEBAND TRANSMISSION AND RECEPTION FOR MULTIBAND

(71) Applicant: Electronics and Telecommunications Research Institute, Daejeon (KR)

(72) Inventors: Sang Won Kim, Daejeon (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/778,572

(22) Filed: Feb. 27, 2013

(65) Prior Publication Data

US 2013/0223488 A1 Aug. 29, 2013

(30) Foreign Application Priority Data

Feb. 27, 2012 (KR) .......................... 10-2012-0019538

(51) Int. Cl.
*H04B 1/40* (2006.01)

(52) U.S. Cl.
CPC ...................................... *H04B 1/403* (2013.01)

(58) Field of Classification Search
CPC ......... H04B 1/30; H04B 1/403; H04B 1/0053
USPC ......................................... 375/219, 224, 345
See application file for complete search history.

(56) References Cited

U.S. PATENT DOCUMENTS

| 7,088,981 | B2* | 8/2006 | Chang ........................... 455/326 |
| 7,139,547 | B2* | 11/2006 | Wakayama et al. ............ 455/333 |
| 8,135,373 | B2* | 3/2012 | Deguchi et al. ............... 455/313 |

* cited by examiner

*Primary Examiner* — Leon Flores
(74) *Attorney, Agent, or Firm* — Ladas & Parry LLP

(57) ABSTRACT

A wideband transmitting and receiving apparatus including a local oscillator (LO) synthesizer providing a constant output to a wide band is provided. The LO synthesizer may generate LO signals of different amplitudes according to channels. The LO synthesizer may store the amplitudes of the LO signals different according to the channels and compensate the amplitudes of the LO signals using the stored amplitudes. Accordingly, the LO synthesizer may output the LO signals of uniform amplitudes irrespective of the channels.

16 Claims, 5 Drawing Sheets

APPARATUS FOR WIDEBAND TRANSMISSION AND RECEPTION FOR MULTIBAND

CROSS-REFERENCE TO RELATED APPLICATION

This application claims the benefit of Korean Patent Application No. 10-2012-0019538, filed on Feb. 27, 2012, in the Korean Intellectual Property Office, the disclosure of which is incorporated herein by reference.

BACKGROUND

1. Field of the Invention

The present invention relates to an apparatus for wideband transmission and reception, capable of transmitting and receiving data by using a plurality of wideband channels or varying a frequency bandwidth, and more particularly, to an apparatus for wideband transmission and reception, which includes a local oscillator (LO) synthesizer providing a constant output to a wideband.

2. Description of the Related Art

A cognitive radio (CR) technology, being recently spotlighted, enables data transmission and reception using frequency resources of a first user without interfering with the first user by monitoring in real time the frequency resources not used by the first user. Not to cause an interference with the first user, when the first user appears in a band in use, a CR system needs to recognize this and move a corresponding channel. In case of institute of electrical and electronics engineers (IEEE) 802.22 supporting the CR technology, data transmission and reception needs to be enabled in a television (TV) band of about 54 MHz to 892 MHz. Additionally, when a TV signal, which is the first user, is detected, the channel in use needs to be promptly changed to another channel. Therefore, a plurality of channels of an extremely wide band are necessary. Here, it becomes difficult to maintain a high signal to noise ratio (SNR) in all the channels compared to in a narrow-band system. In addition, in European computer manufacturers association (ECMA)-392 which is another standard applying the CR technology along with the IEEE 802.22, a flexible transceiver is demanded, which is capable of converting to a 2×2 or higher multi input multi output (MIMO) mode and a multichannel mode based on the conventional single input single output (SISO) mode and varying a signal bandwidth.

In addition, demands for a hardware platform supporting a multiple standard including the CR technology are recently increasing. A data transceiver needs to support ultra wideband characteristics and a flexible bandwidth to support various standards. In a data transceiver using such a wideband channel, an error in amplitude and phase of a baseband in-phase and quadrature (IQ) signal, leakage of carriers of a transmitting and receiving unit, and a direct current (DC) offset need to be controlled for each channel.

Accordingly, there is an increasing desire for a data transceiver having an improved structure maintaining a high performance in a wideband channel and supporting a flexible bandwidth.

SUMMARY

An aspect of the present invention provides a local oscillator (LO) synthesizer providing a constant output over a wide bandwidth.

Another aspect of the present invention is in obtaining a high signal to noise ratio (SNR) in every channel by compensating amplitude and phase of a baseband in-phase and quadrature (IQ) signal and carrier leakage of a transmitter caused by a wideband channel.

According to an aspect of the present invention, there is provided a transmitting and receiving apparatus including a local oscillator (LO) to generate an LO signal, a level detector to measure amplitude of the LO signal, and a variable amplifier to control the amplitude of the LO signal.

The amplitude of the LO signal may be varied according to a frequency band of the LO signal, and the variable amplifier may control the amplitude of the LO signal to be uniform.

The transmitting and receiving apparatus may further include a distributor, and a plurality of low pass filters, wherein the distributor supplies the amplitude-controlled LO signal to the plurality of low pass filters.

The transmitting and receiving apparatus may further include an antenna unit to receive a received signal of a high frequency band, and a plurality of switches corresponding to the plurality of low pass filters, respectively, wherein the plurality of switches may select any one LO signal among LO signals passed through the plurality of low pass filters, according to the frequency band of the received signal.

The selected LO signal may be used to convert the received signal to a baseband signal.

The transmitting and receiving apparatus may further include an in-phase quadrature (IQ) calculation unit to calculate an average of IQ signals of a baseband according to a low pass filter that passed the LO signal in a state in which the antenna is not receiving the high frequency signal, a memory unit to store the average of the IQ signals, and a direct current (DC) offset conversion unit to compensate for a DC offset of the received signal converted to the baseband signal, by referencing the average of the IQ signals stored in the memory unit according to the frequency band of the received signal.

According to another aspect of the present invention, there is provided a transmitting apparatus using a plurality of channels, the transmitting apparatus including a local oscillator (LO) to generate LO signals having different amplitudes according to the plurality of channels, a level detector to measure the amplitudes of the LO signals, a variable amplifier to control the amplitudes of the LO signals, a test signal generation unit to generate test signals of a baseband, a carrier leakage removal unit to measure amplitudes of the test signals of the baseband according to the plurality of channels and to control amplitude of a transmitted signal using the measured amplitude, and a frequency conversion unit to convert the amplitude-controlled transmitted signal to a high frequency band signal using the amplitude-controlled LO signal.

The carrier leakage removal unit may control the amplitudes of the test signals of the baseband to be uniform.

The transmitting apparatus may further include a distributor, a plurality of low pass filters, wherein the distributor may supply the amplitude-controlled LO signal to the plurality of low pass filters.

The transmitting apparatus may further include a plurality of switches corresponding to the plurality of low pass filters, respectively, wherein the plurality of switches may select any one LO signal among LO signals passed through the plurality of low pass filters, according to the plurality of channels.

According to another aspect of the present invention, there is provided a receiving apparatus using a plurality of channels, the receiving apparatus including a receiving unit to receive a received signal of a high frequency band corresponding to any one channel among the plurality of channels, a local oscillator (LO) to generate LO signals having different amplitudes according to the plurality of channels, a level detector to measure the amplitudes of the LO signals, a variable amplifier to control the amplitudes of the LO signals to be uniform, and a frequency conversion unit to convert the received signal to a baseband signal using the amplitude-controlled LO signal.

The receiving apparatus may further include a distributor, a plurality of low pass filters, wherein the distributor may supply the amplitude-controlled LO signal to the plurality of low pass filters.

The receiving apparatus may further include a plurality of switches corresponding to the plurality of low pass filters, respectively, wherein the plurality of switches select any one LO signal among LO signals passed through the plurality of low pass filters, according to the plurality of channels.

The receiving apparatus may further include an in-phase quadrature (IQ) calculation unit to calculate an average of IQ signals of a low frequency band according to a low pass filter that passed the LO signal in a state in which the receiving unit is not receiving the received signal, a memory unit to store the average of the IQ signals, and a direct current (DC) offset conversion unit to compensate for a DC offset of the received signal converted to the baseband signal, by referencing the average of the IQ signals stored in the memory unit according to the frequency band of the received signal.

The receiving apparatus may further include a test signal generation unit to generate test signals respectively corresponding to the plurality of channels, an IQ calculation unit to calculate an average of IQ signals according to the plurality of channels of the test signals, according to outputs of the test signals from the frequency conversion unit, and an IQ compensation unit to compensate for IQ according to the plurality of channels of the received signal using the average of the IQ signals according to the plurality of channels.

EFFECT

According to embodiments of the present invention, a local oscillator (LO) synthesizer may be provided, which provides a constant output over a wide bandwidth.

Additionally, according to embodiments of the present invention, a high signal to noise ratio (SNR) may be obtained in every channel by compensating amplitude and phase of a baseband in-phase and quadrature (IQ) signal and carrier leakage of a transmitter caused by a wideband channel.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
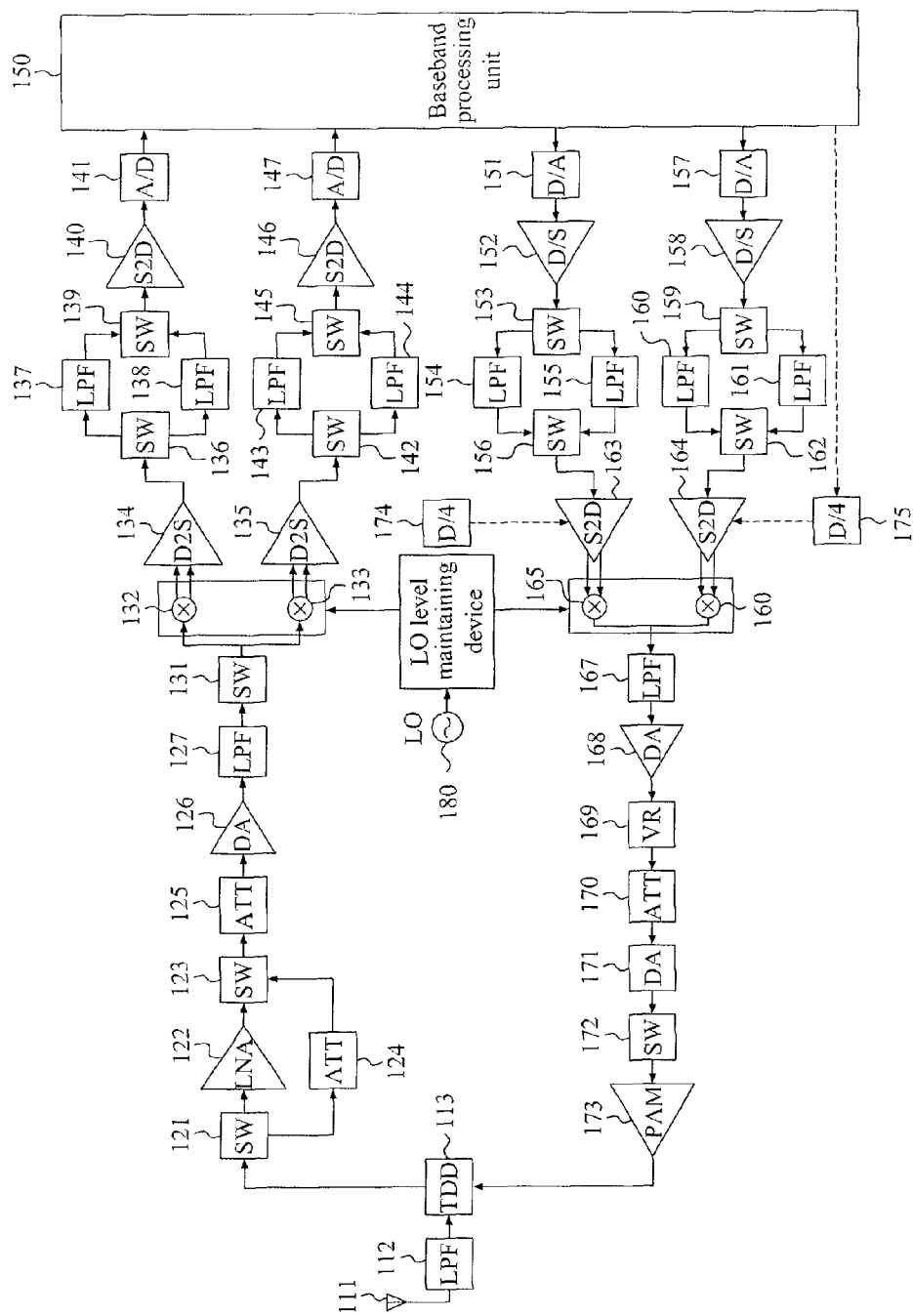
FIG. 1 is a block diagram illustrating a data transmitting and receiving apparatus that maintains a high transmission and reception performance and supports a flexible bandwidth in a wideband channel, according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a data transmitting and receiving apparatus that maintains a high transmission and reception performance and supports a flexible bandwidth in a wideband channel, according to an embodiment of the present invention.

The data transmitting and receiving apparatus may transmit and receive data via at least one data transmission and reception antenna 111. A received signal is passed through a low pass filter 112 and connected to a transmitting unit and a receiving unit through a time division duplex (TDD) switch 113 or a duplexer.

When the received signal has a relatively low amplitude, a switch 121 may transmit the received signal to a low noise amplifier (LNA) 122. When the received signal has a relatively high amplitude, the switch 121 may transmit the received signal to an attenuator 124 so as to prevent saturation of the LNA 122. The attenuator 124 may adjust the amplitude of the received signal to maintain a constant signal level. The switch 123 may switch received signals of two paths, thereby providing a communication path.

A drive amplifier (DA) 126 may amplify amplitude of the received signal. A low pass filter 127 may remove a harmonic signal from the received signal. A frequency down converter may receive the signal from which the harmonic signal is removed. A switch 131 may switch signals received to frequency transformers 132 and 133 that frequency-transforms signals of respectively different frequency bands, thereby increasing transmission and reception isolation. The signal input to the frequency down converter may be output as a baseband differential in-phase and quadrature (IQ) signal.

The baseband differential IQ signal may be transformed to a single ended signal by a transformer or operational amplifiers (OP AMP) 134 and 135. A component I of the differential IQ signal passes through one variable band low pass filter or at least two low pass filters, for example low pass filter banks 137 and 138, mounting switches 136 and 139 at an input and output terminal. A component Q of the differential IQ signal passes through one variable band low pass filter or at least two low pass filter banks 143 and 144, mounting switches 142 and 145 at an input and output terminal. The low pass filter banks 137, 138, 143, and 144 enable reception of signals of various bandwidths.

Converters 140 and 146 may convert the output signal back to a differential signal. Analog/digital (A/D) converters 141 and 147 may convert the received signal to a digital signal. According to an aspect, a capacitor may be used to remove a direct current (DC) offset by interrupting a DC signal before input to the A/D converters 141 and 147.

When a DC offset is generated after input to the A/D converters 141 and 147, an average of baseband signals is calculated by a baseband processing unit 150 in a state in which an input signal is absent, and the average is stored in a memory. When an input signal is present, the baseband processing unit 150 may remove the CD offset by subtracting the average stored in the memory from the input signal.

When amplitude and phase of the baseband IQ signal being received need to be compensated, the baseband processing unit 150 may receive a test signal and store the amplitude and the phase of the baseband IQ signal with respect to each channel in the memory. The baseband processing unit 150 may compensate the amplitude and the phase of the baseband IQ signal when a signal is actually received.

When transmitting a signal, D/A converters 151 and 157 may convert the baseband IQ signal being transmitted into an analog signal. According to an aspect, DC components of the analog signal converted from the baseband IQ signal may be removed using a capacitor. Converters 152 and 158 may convert the baseband IQ signal into a single ended signal. The baseband IQ signal may be passed through a variable band low pass filter or at least two low pass filter banks, for example low pass filter banks 154, 155, 160, and 161 mounting switches 153, 156, 159, and 162 at an input and output terminal. The low pass filter banks 154, 155, 160, and 161 enable transmission of signals of various bandwidths.

Here, the baseband processing unit 150 may store an amplitude and phase compensation value for a baseband transmission IQ signal of each channel in the memory using the test signal. The baseband processing unit 150 may transmit the baseband transmission IQ signal compensated using the amplitude and phase compensation value stored in the memory.

A transformer or OP AMPs 163 and 164 may convert the baseband transmission IQ signal back to a differential signal. The converted transmission signal may be input to a frequency up converter. To remove leakage of a carrier from an output of the frequency up converter, a carrier leakage control value of each channel stored in a memory of the baseband processing unit 150 may be input to the OP AMPs 163 and 164 through the D/A converters 174 and 175. Here, the carrier leakage control value of each channel may be applied as an analog voltage value.

From the output of the frequency up converter, harmonic components may be removed using a low pass filter 167. In case of an ultra wideband transmitter, a variable bandwidth filter may be used to remove the harmonic components so that transmitted signals of a low channel are not output to other bands in use.

The filtered signal may be amplified to have a sufficient amplitude by passing through a DA 168. A thermistor VR 169 may compensate the amplitude transmitted signal according to temperature. A variable attenuator 170 may control transmission output power. A DA 171 may amplify the transmitted signal passed through the variable attenuator 170. A switch 172 may increase transmission and reception isolation before the transmitted signal is input to a final power amplifier 173. The switch 172 before the final power amplifier 173 is necessary to increase the transmission and reception isolation in case that the DA 171 is not quickly switched on and off.

The final power amplifier 173 may amplify the transmitted signal to have a sufficient amplitude. The amplified transmitted time division duplex (TDD) signal may be transmitted to the at least one transmission and reception antenna 111. According to an aspect, the low pass filter 112 may be mounted before the at least one transmission and reception antenna 111 to remove signals of an undesired band during reception and remove transmitted signals of an unnecessary band, accordingly increasing performance of the transmitting and receiving apparatus.

Figure 2:
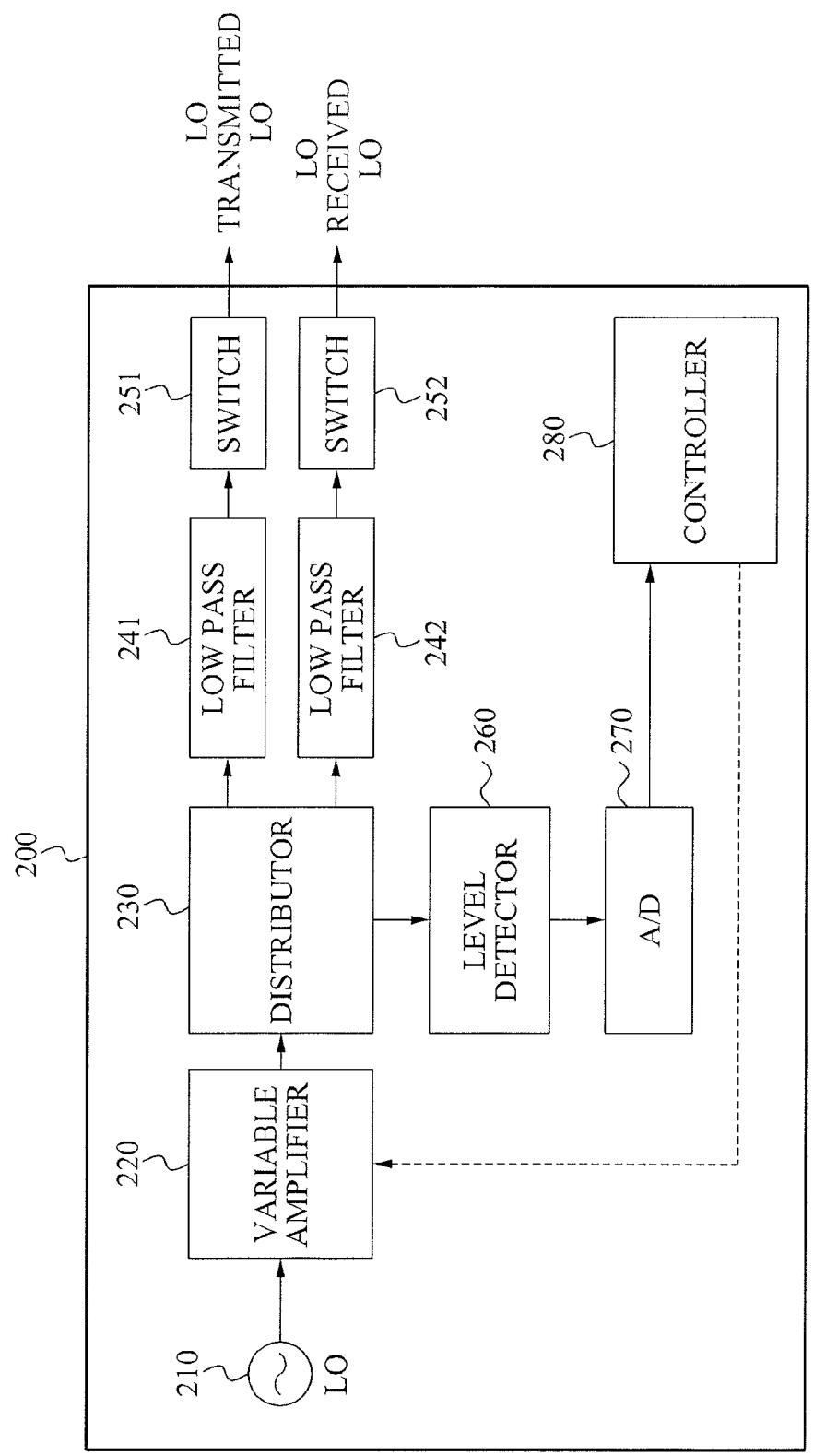
FIG. 2 is a block diagram illustrating a transmission and reception local oscillator (LO) frequency synthesizer for maintaining a constant output, according to an embodiment of the present invention.

FIG. 2 is a block diagram illustrating a transmission and reception local oscillator (LO) frequency synthesizer for maintaining a constant output, according to an embodiment of the present invention.

The synthesizer may include an LO 210, a variable amplifier 220, a distributor 230, low pass filter banks 241 and 242, switches 251 and 252, a level detector 260, an A/D converter 270, and a controller 280.

The LO 210 may generate an LO signal. For example, the LO 210 may generate LO signals of various frequency bands. In this case, amplitudes of the LO signals may be different depending on the frequency bands. According to an aspect, the amplitude of the LO signal may reduce according to an increase in frequency of the channel.

The level detector 260 may measure the amplitude of the LO signal. The A/D converter 270 may convert the amplitude of the LS signal being measured into a digital signal. The controller 280 may control the variable amplifier 220 according to the amplitude of the LO signal. According to an aspect, the controller 280 may control the amplitude of the LO signal passed through the variable amplifier 220 to be uniform.

The distributor 230 may apply the LO signal maintaining uniform amplitude as an LO input to frequency converters respectively of a transmitting unit and a receiving unit. A first low pass filter 241 may remove harmonic components from the LO signal applied as the LO input of the frequency converter of the transmitting unit. A second low pass filter 242 may remove harmonic components from the LO signal applied as the LO input of the frequency converter of the receiving unit.

In this case, switches may be used at transmission and reception LO input paths, respectively. Therefore, components of the LO signal may be prevented from entering the transmission and reception paths in a TDD operation mode.

Figure 3:
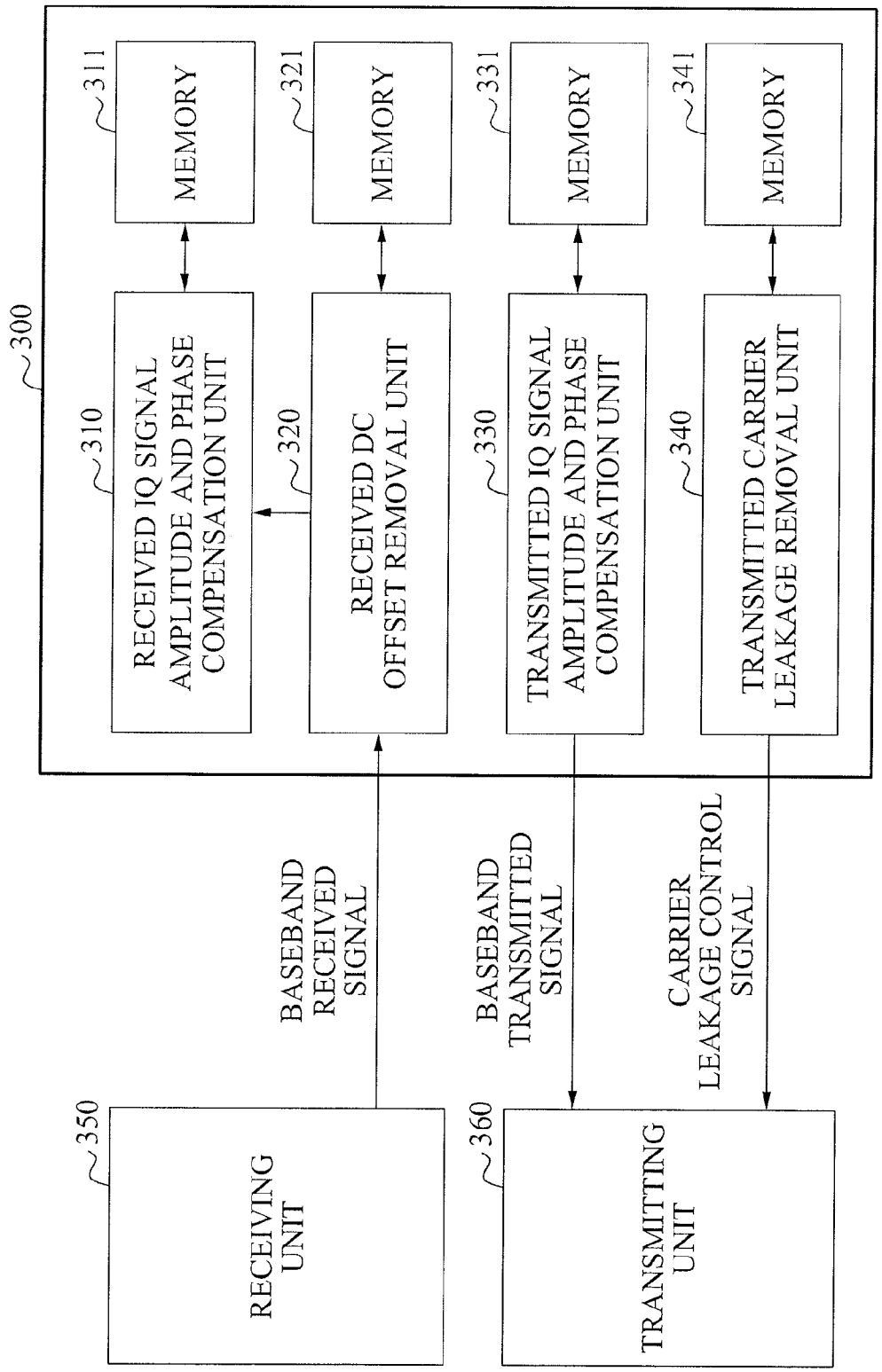
FIG. 3 is a block diagram illustrating a structure of a baseband processing unit according to an embodiment of the present invention.

FIG. 3 is a block diagram illustrating a structure of a baseband processing unit 300 according to an embodiment of the present invention. The baseband processing unit 300 may include an amplitude and phase compensation unit 310 for a received IQ signal, a received DC offset removal unit 320, an amplitude and phase compensation unit 330 for a transmitted IQ signal, a transmitted carrier leakage removal unit 340, and memories 311, 321, 331, and 341.

A transmission and reception apparatus that uses a plurality of wideband channels needs to remove a DC offset, remove a carrier leakage, and compensate amplitude and phase of a baseband IQ signal for each channel, to maintain high performance.

First, with respect to a transmitting unit 360, a baseband transmitted IQ signal output from a baseband processing unit 300 is passed through a frequency up converter (not shown) included in the transmitting unit 360. Here, a carrier leakage signal needs to be removed from the output of the frequency up converter. The baseband processing unit 300 may generate a baseband test signal to remove a transmitted carrier leakage. In addition, the baseband processing unit 300 may remove the carrier leakage by controlling an input power level of each channel in an input of the frequency up converter. Here, compensation values according to the channels may be stored in a memory 341 and applied when a signal is actually transmitted.

The amplitude and phase of the baseband transmitted IQ signal transmitted from the baseband processing unit 300 may be compensated for each channel at a final output terminal of the transmitting unit 360, using the test signal generated by the amplitude and phase compensation unit 330. In this case, compensation values may be stored in a memory 331 and applied when a signal is actually transmitted.

In the receiving unit 350, a capacitor is used to remove a DC component right before input to the baseband processing unit 300. However, fine DC offset may be generated in an A/D converter of the baseband processing unit 300.

To remove the fine DC offset, the received DC offset removal unit 320 may calculate an average of baseband IQ signals according to the channels in a termination state in which an input to the receiving unit 350 is absent, and store the average in a memory 321. When the baseband processing unit 300 actually receives a received signal, the received DC offset removal unit 320 may subtract the average stored in the memory 321 from the baseband IQ signal being received, thereby removing the DC offset.

The amplitude and phase compensation unit 310 may apply the test signal to the input of the receiving unit 350. The amplitude and phase compensation unit 310 may find an optimal IQ compensation value and store the optimal IQ compensation value in a memory 311. When the baseband processing unit 300 actually receives a signal, the amplitude and phase compensation unit 310 may perform compensation by applying the optimal IQ compensation value stored in the memory 311 to each channel.

Figure 4:
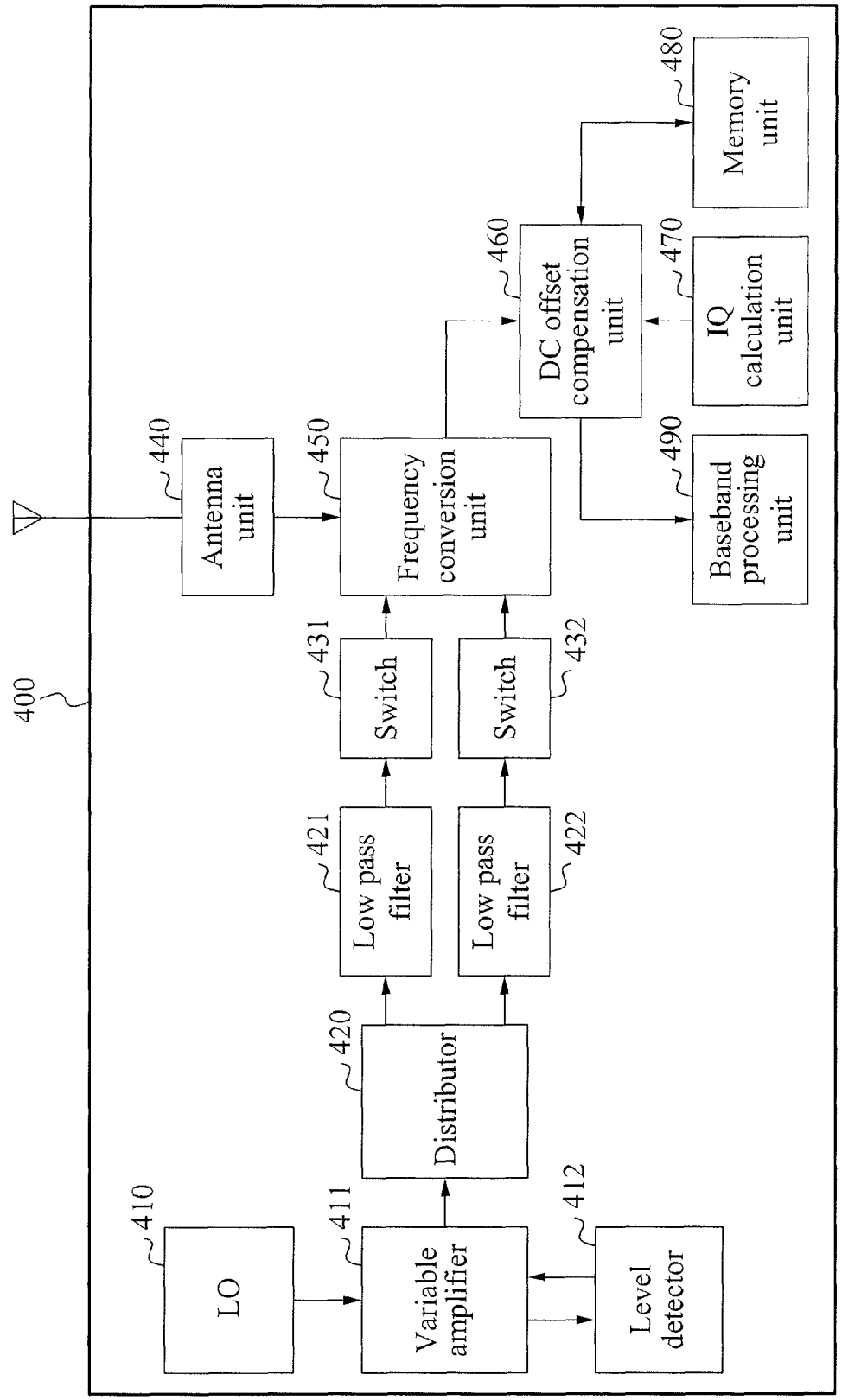
FIG. 4 is a block diagram illustrating a structure of a transmitting and receiving apparatus according to an embodiment of the present invention.

FIG. 4 is a block diagram illustrating a structure of a transmitting and receiving apparatus 400 according to an embodiment of the present invention.

The transmitting and receiving apparatus 400 may include an LO 410, a variable amplifier 411, a level detector 412, a distributor 420, low pass filter banks 421 and 422, switches 431 and 432, a frequency conversion unit 450, an antenna unit 440, a DC offset compensation unit 460, an IQ calculation unit 470, a memory unit 480, and a baseband processing unit 490.

The LO 410 may generate LO signals. According to an aspect, the LO 410 may generate LO signals of different frequencies. The LO signals of different frequencies may be defined as LO signals of different channels. When channels of the LO signals are different, amplitudes of the LO signals may be different. For example, when a frequency of a channel is high, the amplitude of the LO signal may be decreased.

The level detector 412 may measure the amplitudes of the LO signals.

The variable amplifier 411 may control the amplitudes of the LO signals. According to an aspect, the variable amplifier 411 may control the amplitudes of the LO signals with respect to each channel to be uniform.

The distributor 420 may supply the amplitude-controlled LO signals to a plurality of low pass filters for receiving or transmitting. When the LO signals are used for receiving, a first low pass filter 421 may remove harmonic components from the LO signals. The LO signals passed through the first low pass filter 421 may be used for demodulation of a received signal in the frequency conversion unit 450. In addition, when the LO signals are used for transmitting, a second low pass filter 422 may remove harmonic components from the LO signals. The LO signals passed through the second low pass filter 422 may be used for modulation of a transmitted signal in the frequency conversion unit 450.

The switches 431 and 432 may correspond to the respective low pass filters. When the frequency conversion unit 450 operates in a TDD mode, the switches 431 and 432 may interrupt the LO signals for receiving and transmitting from entering other paths.

The antenna unit 440 may receive the received signal of a high frequency band. Although only two low pass filters 421 and 422 and the two switches 431 and 432 are shown in FIG. 4, more than two low pass filters and corresponding switches may be included according to another embodiment. In this case, pluralities of low pass filters and switches may be included to receive the signals of the high frequency band received using different frequency channels. Here, the switches may select any one LO signal among the plurality of LO signals passed through the low pass filters according to the frequency bands in which the received signal or the transmitted signal is transmitted.

That is, a first switch may select an LO signal passed through the first low pass filter 421 to demodulate the received signal received using a first frequency band. A second switch may select an LO signal passed through the second low pass filter 422 to demodulate the received signal received using a second frequency band.

A third switch may select an LO signal passed through a third low pass filter to modulate the received signal received using a third frequency band. A fourth switch may select an LO signal passed through a fourth low pass filter to modulate the received signal received using a fourth frequency band.

The IQ calculation unit 470 may calculate an average of baseband IQ signals according to the low pass filters 421 and 422 that passed the LO signals in a state in which the antenna unit 440 is not receiving the received signal of a high frequency band. The average may be stored in the memory unit 480.

When the antenna unit 440 is receiving the received signal of the high frequency band, the DC offset compensation unit 460 may compensate the DC offset of the received signal converted to a baseband signal by referencing the average of the IQ signals stored in the memory unit 480 according to the frequency band of the received signal.

The baseband processing unit 490 may process the received signal from which the DC offset is removed.

Figure 5:
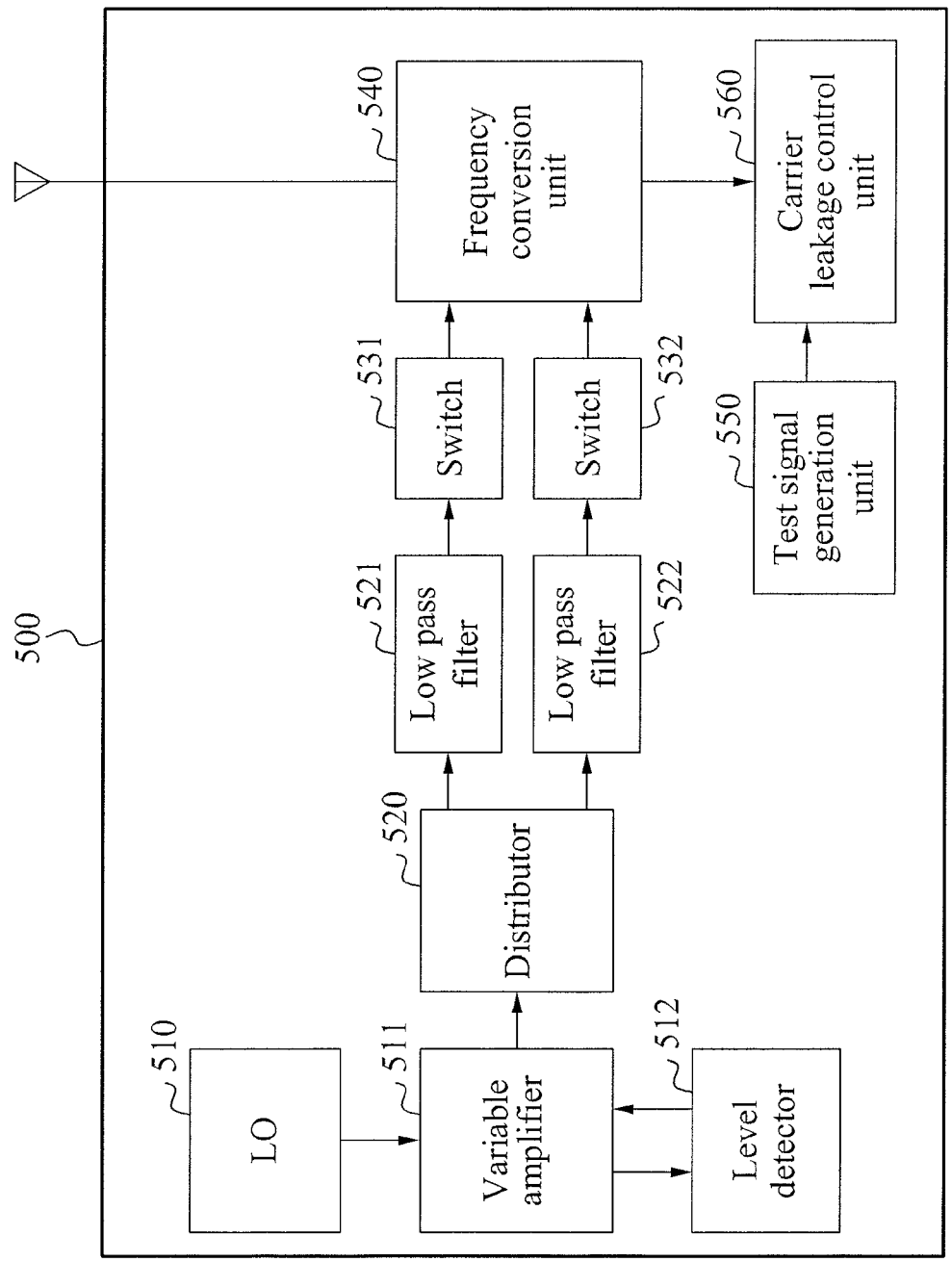
FIG. 5 is a block diagram illustrating a structure of a transmitting and receiving apparatus according to another embodiment of the present invention.

FIG. 5 is a block diagram illustrating a structure of a transmitting and receiving apparatus 500 according to another embodiment of the present invention.

The transmitting and receiving apparatus 500 may include an LO 510, a variable amplifier 511, a level detector 512, a distributor 520, low pass filter banks 521 and 522, switches 531 and 532, a frequency conversion unit 540, a carrier leakage control unit 560, and a test signal generation unit 550.

The LO 510 may generate LO signals. According to an aspect, the LO 510 may generate LO signals of different frequencies. The LO signals of different frequencies may be defined as LO signals of different channels. When channels of the LO signals are different, amplitudes of the LO signals may be different.

The level detector 512 may measure the amplitudes of the LO signals.

The variable amplifier 511 may control the amplitudes of the LO signals. According to an aspect, the variable amplifier 511 may control the amplitudes of the LO signals with respect to each channel to be uniform.

The distributor 520 may supply the amplitude-controlled LO signals to a plurality of low pass filters 521 and 522 for receiving or transmitting. The LO signals may be passed through the plurality of low pass filters 521 and 522. The switches 531 and 532 corresponding to the low pass filters 521 and 522 may select any one of the LO signals passed through the low pass filters 521 and 522.

According to an aspect, the test signal calculation unit 550 may generate test signals of a baseband. According to an aspect, the test signal calculation unit 550 may generate test signals of different channels. In this case, amplitudes of the test signals may be different depending on the channels.

According to an aspect, the test signal generation unit 550 may generate test signals of channels corresponding to the LO signals generated by the LO 510. Here, in consideration of the channels of the LO signals and the channels of the test signals, the switches 531 and 532 may select any one LO signal among the LO signals passed through the plurality of low pass filters 521 and 522.

The carrier leakage control unit 560 may measure amplitudes of the test signals with respect to each channel. In addition, the carrier leakage control unit 560 may store the measured amplitudes in a memory.

According to an aspect, the carrier leakage control unit 560 may control amplitudes of transmitted signals with respect to each channel. The carrier leakage control unit 560 may control the amplitudes of the test signals of the baseband by referencing the amplitudes of the test signals stored in the memory, so that the transmitted signals are uniform irrespective of the channels.

The frequency conversion unit 540 may convert the transmitted signal to a frequency band signal using the amplitude-controlled LO signals.

According to the embodiment shown in FIG. 5, the carrier leakage control unit 560 may remove a carrier leakage by controlling an input power level of the transmitted signal for each channel in an input of the frequency conversion unit 540. A compensation value for each channel may be stored in a memory and calculated using the test signals.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmitting and receiving apparatus comprising:
a local oscillator (LO) to generate an LO signal;
a level detector to measure amplitude of the LO signal; and
a variable amplifier to control the amplitude of the LO signal,
wherein the amplitude of the LO signal is varied according to a frequency band of the LO signal, and
the variable amplifier controls the amplitude of the LO signal to be uniform.

2. The transmitting and receiving apparatus of claim 1, further comprising:
a distributor; and
a plurality of low pass filters,
wherein the distributor supplies the amplitude-controlled LO signal to the plurality of low pass filters.

3. The transmitting and receiving apparatus of claim 2, further comprising:
an antenna unit to receive a received signal of a high frequency band; and
a plurality of switches corresponding to the plurality of low pass filters, respectively,
wherein the plurality of switches select any one LO signal among LO signals passed through the plurality of low pass filters, according to the frequency band of the received signal.

4. The transmitting and receiving apparatus of claim 3, wherein the selected LO signal is used to convert the received signal to a baseband signal.

5. The transmitting and receiving apparatus of claim 4, further comprising:
an in-phase quadrature (IQ) calculation unit to calculate an average of IQ signals of a baseband according to a low pass filter that passed the LO signal in a state in which the antenna is not receiving the high frequency signal;
a memory unit to store the average of the IQ signals; and
a direct current (DC) offset conversion unit to compensate for a DC offset of the received signal converted to the baseband signal, by referencing the average of the IQ signals stored in the memory unit according to the frequency band of the received signal.

6. The transmitting and receiving apparatus of claim 1, wherein the LO generates a plurality of LO signals, each of the plurality of LO signals having a different frequency band, and an amplitude of each of the LO signals being reduced according to an increase in a frequency of the LO signals.

7. A transmitting apparatus using a plurality of channels, the transmitting apparatus comprising:
a local oscillator (LO) to generate LO signals having different amplitudes according to the plurality of channels;
a level detector to measure the amplitudes of the LO signals;
a variable amplifier to control the amplitudes of the LO signals;
a test signal generation unit to generate test signals of a baseband;
a carrier leakage removal unit to measure amplitudes of the test signals of the baseband according to the plurality of channels and to control amplitude of a transmitted signal using the measured amplitude; and
a frequency conversion unit to convert the amplitude-controlled transmitted signal to a high frequency band signal using the amplitude-controlled LO signal.

8. The transmitting apparatus of claim 7, wherein the carrier leakage removal unit controls the amplitudes of the test signals of the baseband to be uniform.

9. The transmitting apparatus of claim 7, further comprising:
a distributor;
a plurality of low pass filters,
wherein the distributor supplies the amplitude-controlled LO signal to the plurality of low pass filters.

10. The transmitting apparatus of claim 9, further comprising:
a plurality of switches corresponding to the plurality of low pass filters, respectively,
wherein the plurality of switches select any one LO signal among LO signals passed through the plurality of low pass filters, according to the plurality of channels.

11. The transmitting apparatus of claim 7, wherein the amplitude of the LO signals is varied according to a frequency band of the LO signal, and
the variable amplifier controls the amplitude of the LO signal to be uniform.

12. A receiving apparatus using a plurality of channels, the receiving apparatus comprising:
a receiving unit to receive a received signal of a high frequency band corresponding to any one channel among the plurality of channels;

a local oscillator (LO) to generate LO signals having different amplitudes according to the plurality of channels;

a level detector to measure the amplitudes of the LO signals;

a variable amplifier to control the amplitudes of the LO signals to be uniform; and a frequency conversion unit to convert the received signal to a baseband signal using the amplitude-controlled LO signal, wherein the amplitude of the LO signals is varied according to a frequency band of the LO signals.

13. The receiving apparatus of claim 12, further comprising:

a distributor;

a plurality of low pass filters, wherein the distributor supplies the amplitude-controlled LO signal to the plurality of low pass filters.

14. The receiving apparatus of claim 13, further comprising:

a plurality of switches corresponding to the plurality of low pass filters, respectively, wherein the plurality of switches select any one LO signal among LO signals passed through the plurality of low pass filters, according to the plurality of channels.

15. The receiving apparatus of claim 13, further comprising:

an in-phase quadrature (IQ) calculation unit to calculate an average of IQ signals of a low frequency band according to a low pass filter that passed the LO signal in a state in which the receiving unit is not receiving the received signal;

a memory unit to store the average of the IQ signals; and a direct current (DC) offset conversion unit to compensate for a DC offset of the received signal converted to the baseband signal, by referencing the average of the IQ signals stored in the memory unit according to the frequency band of the received signal.

16. The receiving apparatus of claim 13, further comprising:

a test signal generation unit to generate test signals respectively corresponding to the plurality of channels;

an IQ calculation unit to calculate an average of IQ signals according to the plurality of channels of the test signals, according to outputs of the test signals from the frequency conversion unit; and an IQ compensation unit to compensate for IQ according to the plurality of channels of the received signal using the average of the IQ signals according to the plurality of channels.

* * * * *